United States Patent
Song et al.

(10) Patent No.: US 12,468,341 B2
(45) Date of Patent: Nov. 11, 2025

(54) WEARABLE MEMBER WITH IMAGE PROJECTING ONTO EMITTED GAS

(71) Applicant: VIVO MOBILE COMMUNICATION CO., LTD., Dongguan (CN)

(72) Inventors: Ziwei Song, Dongguan (CN); Qi Ban, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 246 days.

(21) Appl. No.: 18/212,176

(22) Filed: Jun. 20, 2023

(65) Prior Publication Data
US 2023/0333594 A1   Oct. 19, 2023

Related U.S. Application Data

(63) Continuation of application No. PCT/CN2021/139061, filed on Dec. 17, 2021.

(30) Foreign Application Priority Data

Dec. 24, 2020  (CN) .......................... 202011555772.3

(51) Int. Cl.
| | |
|---|---|
| *G06F 1/16* | (2006.01) |
| *A44C 5/00* | (2006.01) |
| *A61L 9/015* | (2006.01) |
| *H04N 23/56* | (2023.01) |
| *H04N 23/57* | (2023.01) |

(52) U.S. Cl.
CPC ............ *G06F 1/163* (2013.01); *A44C 5/0007* (2013.01); *A44C 5/0053* (2013.01); *A61L 9/015* (2013.01);

(Continued)

(58) Field of Classification Search
CPC ....... G06F 1/163; G06F 1/1686; H04N 23/56; H04N 23/57; A44C 5/0007; A44C 5/0053
(Continued)

(56) References Cited

U.S. PATENT DOCUMENTS

| | | |
|---|---|---|
| 2015/0358201 A1 | 12/2015 | Park et al. |
| 2016/0223675 A1 | 8/2016 | Miura et al. |

(Continued)

FOREIGN PATENT DOCUMENTS

| | | |
|---|---|---|
| CN | 2703581 Y | 6/2005 |
| CN | 103731526 A | 4/2014 |

(Continued)

OTHER PUBLICATIONS

International Search Report issued in corresponding International Application No. PCT/CN2021/139061, mailed Mar. 15, 2022, 7 pages.

(Continued)

*Primary Examiner* — James Wu
*Assistant Examiner* — Dakota M Talbert
(74) *Attorney, Agent, or Firm* — IPX PLLC

(57) ABSTRACT

This application discloses a wearable member. The wearable member includes a main body, a gas emitter, and a light source, where the main body includes a first body and a second body; the first body and the second body jointly define a target region; the gas emitter and the light source are disposed in the main body; the gas emitter emits gas to the target region; the light source emits a light beam to the target region; and an overlapped region between a region including the gas and a region including the light beam is used to display an image.

20 Claims, 9 Drawing Sheets

(52) U.S. Cl.
CPC ........... *G06F 1/1686* (2013.01); *H04N 23/56* (2023.01); *H04N 23/57* (2023.01)

(58) Field of Classification Search
USPC .................................................... 361/679.03
See application file for complete search history.

(56) References Cited

U.S. PATENT DOCUMENTS

| | | | |
|---|---|---|---|
| 2016/0313560 | A1 | 10/2016 | Kawamura et al. |
| 2017/0013251 | A1 | 1/2017 | Thigpen |
| 2017/0123487 | A1* | 5/2017 | Hazra .................. G06F 3/0482 |
| 2019/0244581 | A1 | 8/2019 | Tokuchi |
| 2020/0218198 | A1 | 7/2020 | Kline et al. |

FOREIGN PATENT DOCUMENTS

| | | | |
|---|---|---|---|
| CN | 104730731 | A | 6/2015 |
| CN | 104977794 | A | 10/2015 |
| CN | 105204619 | A | 12/2015 |
| CN | 105553497 | A | 5/2016 |
| CN | 106067835 | A | 11/2016 |
| CN | 106371508 | A | 2/2017 |
| CN | 106550106 | A | 3/2017 |
| CN | 107407819 | A | 11/2017 |
| CN | 108919498 | A | 11/2018 |
| CN | 109547053 | A | 3/2019 |
| CN | 109901307 | A | 6/2019 |
| CN | 209000248 | U * | 6/2019 |
| CN | 112671423 | A | 4/2021 |
| JP | 2013140142 | | 7/2013 |
| KR | 20170008524 | A | 1/2017 |
| WO | 2015107750 | A1 | 7/2015 |

OTHER PUBLICATIONS

First Office Action issued in corresponding CN Patent Application No. 202011555772.3, dated Nov. 25, 2021, 10 pages.
Second Office Action issued in corresponding CN Patent Application No. 202011555772.3, dated May 23, 2022, 9 pages.

* cited by examiner

WEARABLE MEMBER WITH IMAGE PROJECTING ONTO EMITTED GAS

CROSS-REFERENCE TO RELATED APPLICATIONS

This application is a continuation of International Application No. PCT/CN2021/139061, filed on Dec. 17, 2021, which claims priority to Chinese patent application No. 202011555772.3, filed on Dec. 24, 2020. The entire contents of each of the above-identified applications are expressly incorporated herein by reference.

TECHNICAL FIELD

This application belongs to the technical field of electronic devices, and specifically, to a wearable member.

BACKGROUND

Wearable devices such as smartwatches and smart bracelets greatly facilitate daily life of consumers. For example, a smartwatch or a smart wearable member is provided with electronic elements such as a camera, so that a consumer can take a picture by carrying a watch that has a small size, thereby being able to record life and the like in time. Therefore, the foregoing wearable devices are increasingly popular in consumers' life.

However, due to the foregoing case, most of components and structures that are integrated into wearable devices in related technologies have similar forms, and functions implemented by wearable members are similar. This is lack of freshness, and reduces consuming desires of consumers.

SUMMARY

This application provides a wearable member.

According to a first aspect, an embodiment of this application provides a wearable member, including:
- a main body, where the main body includes a first body and a second body, the first body and the second body jointly define a target region, the main body is provided with an accommodating space, a side wall, close to the target region, of the main body is provided with a first hole and a second hole, and the first hole and the second hole are communicated with the accommodating space;
- a gas emitter, where the gas emitter is disposed in the accommodating space, and an air outlet of the gas emitter is opposite to the first hole; and
- a light source, where the light source is disposed in the accommodating space, and an out-light surface of the light source is opposite to the second hole, where
- the gas emitter emits gas to the target region through the first hole, the light source emits a light beam to the target region through the second hole, and an overlapped region between a region including the gas and a region including the light beam is used to display an image.

BRIEF DESCRIPTION OF DRAWINGS

The foregoing and/or additional aspects and advantages of this application will become apparent and readily understandable from the descriptions of the embodiments with reference to the following accompanying drawings.

Figure 1:
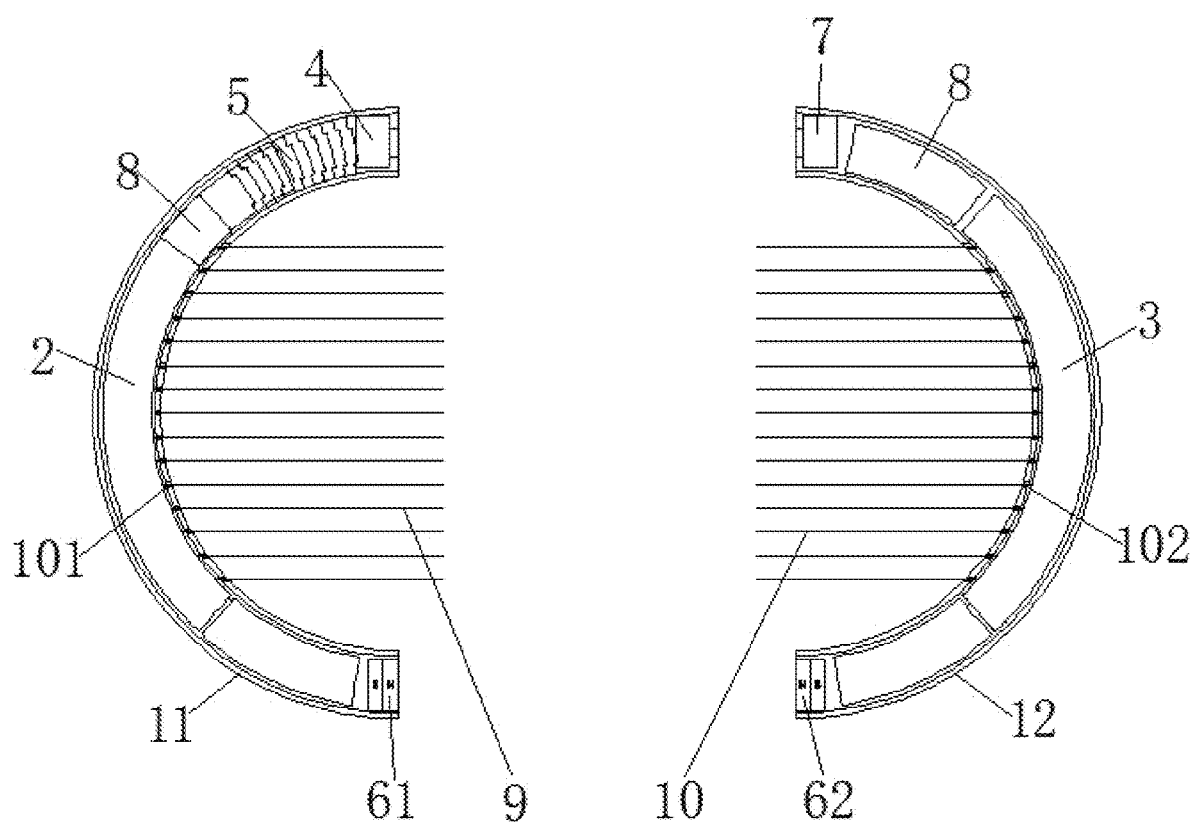
FIG. 1 is a schematic diagram of an overall structure of a wearable member according to an embodiment of this application.

Reference numerals in the accompanying drawings are as follows:

1: main body; 11: first body; 12: second body; 101: first hole; 102: second hole; 2: gas emitter; 3: light source; 4: camera module; 5: flexible section; 6: connection assembly; 61: first magnet; 62: second magnet; 7: trigger; 8: circuit board; 9: gas column; and 10: light beam.

DETAILED DESCRIPTION

The following describes in detail embodiments of this application. Examples of the embodiments are illustrated in the accompanying drawings. Reference numerals which are the same or similar throughout the accompanying drawings represent identical or similar elements or elements having identical or similar functions. The embodiments described below with reference to the accompanying drawings are exemplary and only used to explain this application, and cannot be understood as a limitation on this application. All other embodiments obtained by a person of ordinary skill in the art based on the embodiments of this application without creative efforts shall fall within the protection scope of this application.

Features of terms "first" and "second" in the specification and claims of this application may explicitly or implicitly include one or more such features. In the descriptions of this application, unless otherwise stated, "a plurality of" means two or more. In addition, in the specification and claims, "and/or" represents at least one of connected objects, and a character "/" generally represents an "or" relationship between associated objects.

In the description of this application, it should be understood that orientation or position relationships indicated by terms such as "upper," "lower," "front," "rear," "left," "right," "vertical," "horizontal," "top," "bottom," "inner," "outer," "axial," "radial," and "circumferential" are orientation or position relationships based on the accompanying drawings and are merely intended to facilitate the description of this application and simplify the description, rather than indicating or implying that the apparatus or element mentioned should have a particular orientation or be constructed and operated in a particular orientation, and therefore should not be interpreted as limiting this application.

In the description of this application, it should be noted that, unless expressly specified and defined otherwise, terms such as "mounted," "connected to each other," and "connected to" should be understood in a broad sense. For example, "connection" may be a fixed connection, a detachable connection, or an integral connection; or may be a mechanical connection or an electrical connection; or may be a direct connection, an indirect connection by means of an intermediate medium, or a connection between two elements. For those of ordinary skill in the art, specific meanings of the foregoing terms in this application may be understood based on specific situations.

A wearable member according to embodiments of this application is described below with reference to FIG. 1 to FIG. 9.

As shown in FIG. 1, a wearable member according to an embodiment of this application includes a main body 1, a gas emitter 2, and a light source 3. The main body 1 includes a first body 11 and a second body 12. For example, the main body 1 may be glasses, and the first body 11 and the second body 12 may respectively correspond to two temples of the glasses. Similarly, the main body 1 may be an article such as a headset or a watch, and the first body 11 and the second body 12 respectively correspond to two components of the article. In some implementations, the main body 1 may include only a first body 11 and a second body 12, that is, the first body 11 and the second body 12 constitute the entire main body 1.

The first body 11 and the second body 12 jointly define a target region. The target region may be a space included between the first body 11 and the second body 12. For example, when the main body 1 is glasses, and the first body 11 and the second body 12 are two temples of the glasses, the target region may be a region included between the two temples. The target region may be an upper region or a lower region of the region included between the two temples, so that the target region is limited to a position close to the bodies, thereby ensuring compactness of a structure of the bodies, ensuring that the bodies do not need to occupy a too large space after imaging, and providing convenience for use. The main body 1 is provided with an accommodating space. A side wall, close to the target region, of the main body 1 is provided with a first hole 101 and a second hole 102. The first hole 101 and the second hole 102 are communicated with the accommodating space.

Both the gas emitter 2 and the light source 3 are disposed in the accommodating space of the main body, so that positions of the gas emitter 2 and the light source 3 can be conveniently limited by the accommodating space of the main body, and the main body can be further enabled to protect the gas emitter 2 and the light source 3. The accommodating space may be a relatively airtight chamber formed in the main body 1. The gas emitter 2 and the light source 3 are integrally packaged in the accommodating space. In this case, sizes of the first hole 101 and the second hole 102 are as large as the light beam 10 and the gas can just pass through the first hole 101 and the second hole 102. For example, the first hole 101 and the second hole 102 may be elongated holes, or may be holes structures formed by a plurality of through holes. The accommodating space may be a groove formed outside the main body 1. The gas emitter 2 and the light source 3 are embedded in the accommodating space. In this case, the first hole 101 and the second hole 102 may be understood as openings of the entire groove in the main body 1. An air outlet of the gas emitter 2 is opposite to the first hole 101, and an out-light surface of the light source 3 is opposite to the second hole 102, so that the gas emitted by the gas emitter 2 and the light beam 10 emitted by the light source 3 smoothly pass through the holes to form an image.

The gas emitter 2 emits the gas to the target region through the first hole 101, the light source 3 emits the light beam 10 to the target region through the second hole 102, and an overlapped region between a region including the gas and a region including the light beam 10 is used to display the image. In other words, the image can be formed in a region where the gas emitted by the gas emitter 2 and the light beam 10 emitted by the light source 3 meet each other.

In this application, the gas emitted by the gas emitter 2 coincides with the light beam 10 emitted by the light source 3 by providing the wearable member with the gas emitter 2 and the light source 3, so that the image is formed in a region where the gas emitted by the gas emitter 2 coincides with the light beam 10 emitted by the light source 3. A component and a function that are different from previous components and functions are added to the wearable member in this application, so that the wearable member brings a fresh feeling to consumers, a sense of science and technology of the product is improved, and consuming desires of consumers are increased.

Figure 9:
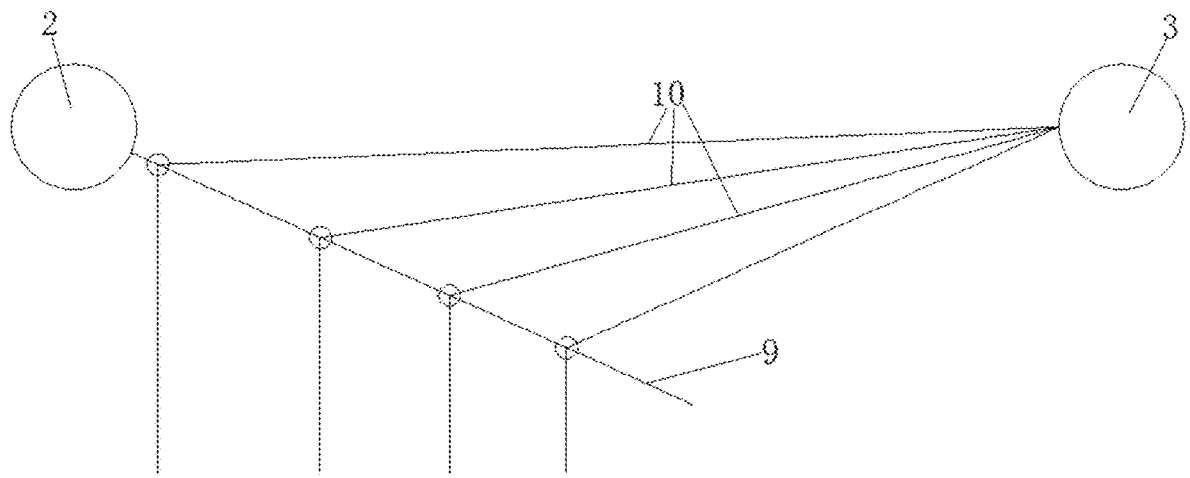
FIG. 9 is a schematic diagram of an imaging principle of a wearable member according to an embodiment of this application.

As shown in FIG. 9, a principle of this application is to create a region having a refractive index different from that of surrounding air. When passing through the region, the light beam 10 for projection is refracted and reflected, thereby being visible to a human eye. However, the gas emitter 2 in this application can change a refractive index of a surrounding environment by emitting gas. For example, the gas emitter 2 can ensure, in the following manners, that a refractive index of a part of the gas is different from that of the other part of the gas, that is, the refractive index of the gas is changed: changing a temperature or a pressure of the part of the gas, or another manner. The light source 3 can control a position of an incident point of the light beam 10. In coordination with a position where the gas emitter 2 generates the gas, a light-emitting point may be set at any position in the gas emitted by the gas emitter 2. Under the action of a galvanometer, N light beams 10 can be generated within a short time, thereby forming N points. When a quantity of points is large enough, a viewer considers the points as a complete line. Then, a plurality of lines form a surface, thereby generating a complete image.

The gas emitted by the gas emitter 2 may be a gas column 9, or may be in various forms such as an aerosol, provided that a refractive index of the gas emitted by the gas emitter 2 can be changed by changing a temperature, a humidity, a pressure, and another factor of the gas. The gas emitter 2 may use a piezoelectric ceramic micro-air pump. The piezoelectric ceramic micro-air pump can compress and release a gas flow by vibrating a ceramic substrate through a piezoelectric effect. In some implementations, the gas emitter 2 may use another component. Because the gas emitter 2 is an existing technology that is already known to those skilled in the art, details are not described herein. The light source 3 may be a laser. Excitation energy is applied to the laser, that is, a voltage is applied between electrodes of a working substance, so that atoms of the working substance are in an excited state. When the working substance is irradiated with light, the atoms in the excited state jump to a lower energy level and emit photons at the same time, thereby generating light due to stimulated emission. In this way, one incident photon can generate two identical photons, two incident photons can generate four photons, . . . , so that laser light can be generated after continuous amplification. The laser is provided with two reflectors, where one performs full reflection, and the other one performs partial reflection. The photons go back and forth between the two reflectors along an axis of a resonant cavity. Each time passing through the working substance, the photons are amplified due to stimulated emission, and the light becomes stronger until an amplification effect of the working substance on the light can counteract output and other loss. In this case, the resonant cavity maintains a specific light intensity. Part of the light passes through a semi-reflective end, and part of the light is reflected back. The light passing through the semi-reflective end is the laser light output from the laser. The laser may be a laser that emits laser light by using a vertical cavity surface. How laser light contains image information to display an image on the gas emitted by the gas emitter 2 has become an existing technology that is well known to those skilled in the art. Details are not described herein.

Figure 3:
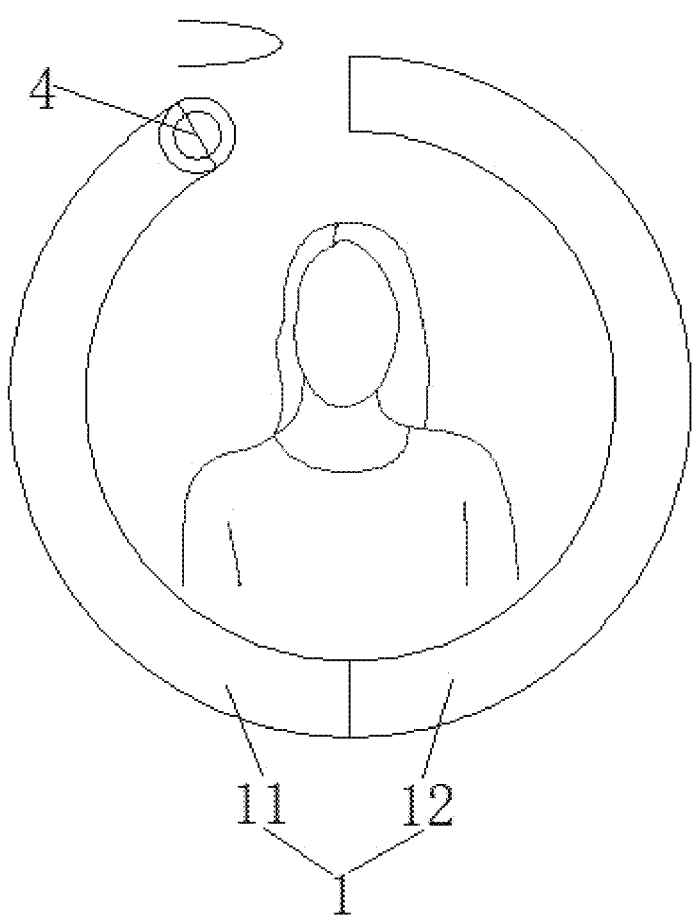
FIG. 3 is a schematic diagram of a first using state of a wearable member according to an embodiment of this application.

In some implementations, as shown in FIG. 3, the wearable member further includes a camera module 4. The camera module 4 is disposed on the main body 1. The camera module 4 is electrically connected to the light source 3. The overlapped region is used to display an image obtained by the camera module 4, that is, the image obtained by the camera module 4 can be displayed under the cooperation of the light source 3 and the gas emitter 2, so that a display screen can be replaced, and space, occupied by the display screen, of the wearable member can be saved. Therefore, an appearance of the wearable member is more compact. In addition, a sense of science and technology of the product is improved, and use experience of a user is improved. In some implementations, the wearable member may further include a display screen, and display, through the display screen, an image shot by the camera module 4. Further, the image shot by the camera module 4 may be transmitted to another display device in a wired or wireless manner for display. For example, the wearable member is provided with a wireless transmission module. The image shot by the camera module 4 may be transmitted through the wireless transmission module on the wearable member to a mobile phone for display. An image played by the wearable member in the overlapped region may come from an electronic device having a wireless transmission relationship with the wearable member, for example, a mobile phone, or come from a storage of the wearable member. When the image comes from the storage of the wearable member, the wearable member has a storage module. The image shot by the camera module 4 may also be stored in the storage module. Disposing the storage module in the wearable member is an existing technology. Those skilled in the art can know a specific disposing manner. Details are not described herein.

In some implementations, the gas emitter 2 and the light source 3 are disposed opposite to each other, so that the gas emitted by the gas emitter 2 and the light beam 10 emitted by the light source 3 are easy to meet and overlap, thereby ensuring reliability of imaging. That the gas emitter 2 and the light source 3 are disposed opposite to each other may be: the two are face to face, that is, the two are symmetrically disposed on the main body 1, so that the gas emitter 2 is opposite to the light source 3. For example, the two are disposed in middle portions of the two temples, respectively. That the gas emitter 2 and the light source 3 are disposed opposite to each other may be: the two are not face to face, but are staggered from each other. For example, the gas emitter 2 is disposed at the end of one temple, and the light source 3 is disposed at the root of the other temple, so that the gas emitter 2 and the light source 3 are disposed diagonally. However, the gas emitted by the gas emitter 2 and the light beam 10 emitted by the light source 3 can be gathered in the target region, that is, an opening of the first hole 101 and an opening of the second hole 102 face the target region. That the two are staggered from each other may be other cases, for example, a case in which the gas emitter 2 is disposed at an upper portion of the main body 1 while the light source 3 is disposed at a lower portion of the main body 1. These cases are not listed herein.

Further, the gas emitter 2 is disposed in the first body 11, and the light source 3 is disposed in the second body 12. Both the gas emitter 2 and the light source 3 are disposed close to the target region. This ensures compactness of an overall structure and brings convenience for consumers. That the gas emitter 2 is disposed in the first body 11 may include: the gas emitter 2 is disposed at an end of the first body 11; or the gas emitter 2 is disposed in the middle of the first body 11. When there are a plurality of gas emitters 2, all the gas emitters 2 may be uniformly distributed on the first body 11, or all the gas emitters 2 may be disposed on the first body 11 in a centralized manner or the like. For details about a case in which the light source 3 is disposed in the second body 12, reference may be made to the case in which the gas emitter 2 is disposed in the first body 11. However, a manner of disposing the gas emitter 2 in the first body 11 may be different from a manner of disposing the light source 3 in the second body 12. For example, there are a plurality of gas emitters 2, and all the gas emitters 2 are uniformly distributed on the first body 11; and there are a plurality of light sources 3, and all the light sources 3 are disposed at a middle position of the second body 12 in a centralized manner. Further, a quantity of light sources 3 in the foregoing cases may be set to 1, and the light source 3 is located at a middle position of the second body 12.

In some implementations, the main body 1 has a flexible section 5, and the flexible section 5 is flexible. The flexible section 5 can change its own bending angle under the action of an external force. Changing the bending angle includes: changing a bending degree of the flexible section 5 and rotating one end of the flexible section 5 relative to the other end thereof. An orientation of the camera module 4 changes in a case that a bending angle of the flexible section 5 changes. For example, bending the flexible section 5 can enable the camera module 4 to move, without driving the main body 1 to move. When a consumer stops taking a picture of an object in front of the consumer and starts to take a selfie, convenience is brought to the consumer for changing an image shooting direction of the camera module 4. Moreover, the consumer can adjust the image shooting direction of the camera module 4 by changing the bending angle of the flexible section 5, instead of changing a position of the entire wearable member. This enhances stability of the camera module 4, makes the wearable member more convenient to use, and improves use experience of the consumer. The flexible section 5 may be made of a flexible material, for example, rubber. The flexible section 5 may be formed by using a specific structure. The specific structure of the flexible section 5 has become an existing technology, for example, an existing bendable pipeline, or a flexible pipeline used in surgery. The flexible section 5 may be bent under the action of an external force, for example, manpower. In some implementations, the flexible section 5 may be bent by an electronic component disposed in the flexible section 5. For example, a drive mechanism, such as a motor, is disposed in the flexible section 5; and a control mechanism is enabled, by controlling the drive mechanism, to drive the flexible section 5 to bend.

In some implementations, the camera module 4 is disposed at an end, close to the flexible section 5, of the main body 1, that is, a position of the flexible section 5 is close to a position of the camera module 4. During bending of the flexible section 5, most solid portions of the wearable member can remain unchanged, and an end of the main body 1 can swing by only bending the flexible section 5. When the camera module 4 is disposed in this manner, the image shooting direction of the camera module 4 can be changed in a case that a minimum quantity of portions of the entire wearable member are moved. This further brings convenience to the consumer. That the camera module 4 is disposed at the end, close to the flexible section 5, of the main body 1 may include: the flexible section 5 is attached to the end of the main body 1 at which the camera module 4 is disposed, or there is a specific distance between the flexible section 5 and the end of the main body 1 at which the camera module 4 is disposed. For example, when the main body 1 is a bracelet, the foregoing distance does not exceed a quarter of the circumference of the entire bracelet. In some implementations, there may be the following case: The flexible section 5 and the end of the main body 1 at which the camera module 4 is disposed are located on a same component of the main body 1. For example, when the main body 1 is glasses, the flexible section 5 and the end at which the camera module 4 is disposed are located on a same temple. In this case, the flexible section 5 may be at any position of the temple.

In some implementations, the camera module 4 is disposed at an end of the main body 1. For example, the camera module 4 is disposed at the free end of a temple. The camera module 4 may be disposed in the end of the main body 1, or may be disposed in parallel with the end of the main body 1. In this case, an additional accommodating space used for accommodating the camera module 4 may radially extend from the end of the main body 1. When determining an image shooting direction of the camera module 4, a consumer can use, as a reference, a direction pointed by an end of the main body 1, so that the image shooting direction of the camera module 4 can be determined more accurately. A unique layout is used in a solution of this application, so that the consumer can determine the image shooting direction more intuitively. This helps the consumer accurately shoot a desired scene. For example, in the solution of this embodiment of this application, the end of the main body 1 is at a position that is in the entire wearable member and that can better attract attention of the consumer; and the direction pointed by the end of the main body 1 is also definite. Therefore, the consumer can directly or indirectly determine the image shooting direction of the camera module 4 as long as he/she sees the direction pointed by the conspicuous end. In the related art, a camera is mounted on a curved surface. For example, the camera module 4 is disposed on a bracelet, and captures an image through an opening in an outer surface of the bracelet. In the related art, there is no specific reference for determining the image shooting direction; and because the camera is small, it is hard to determine an image shooting direction of the camera. As a result, the desired scene can be accurately shot only when an image shooting direction is adjusted with reference to a display device during an image shooting process.

Further, a groove is formed in an end surface at the end of the main body 1. For example, the groove is formed in an end surface at the free end of a temple. In other words, the image shooting direction of the camera module 4 is made the same as the direction pointed by the end of the main body 1. In this case, the image shooting direction of the camera module 4 can be adjusted by adjusting the direction pointed by the end of the main body 1, so that the image shooting direction of the camera module 4 can be determined more accurately. In addition, mounting the camera module 4 in the groove can protect the camera module 4 and prevent the camera module 4 from being damaged by an external force.

Figure 2:
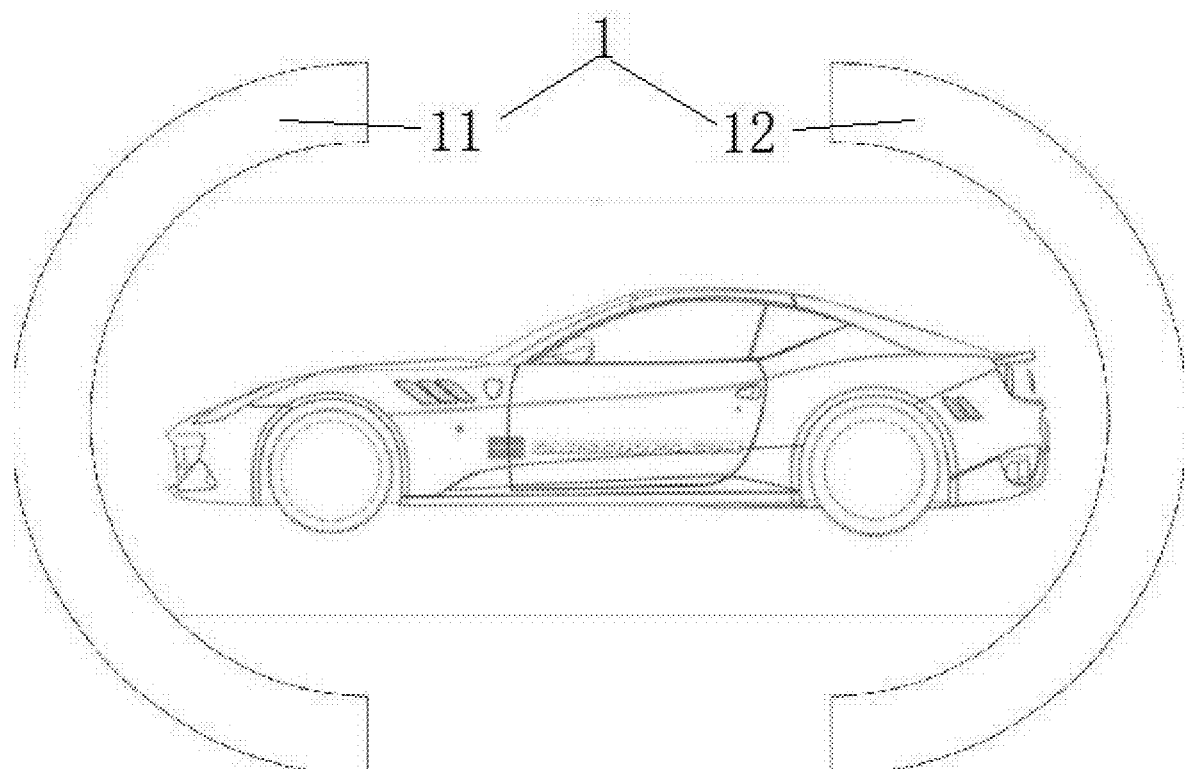
FIG. 2 is a schematic diagram of an imaging status of a wearable member according to an embodiment of this application.
Figure 8:
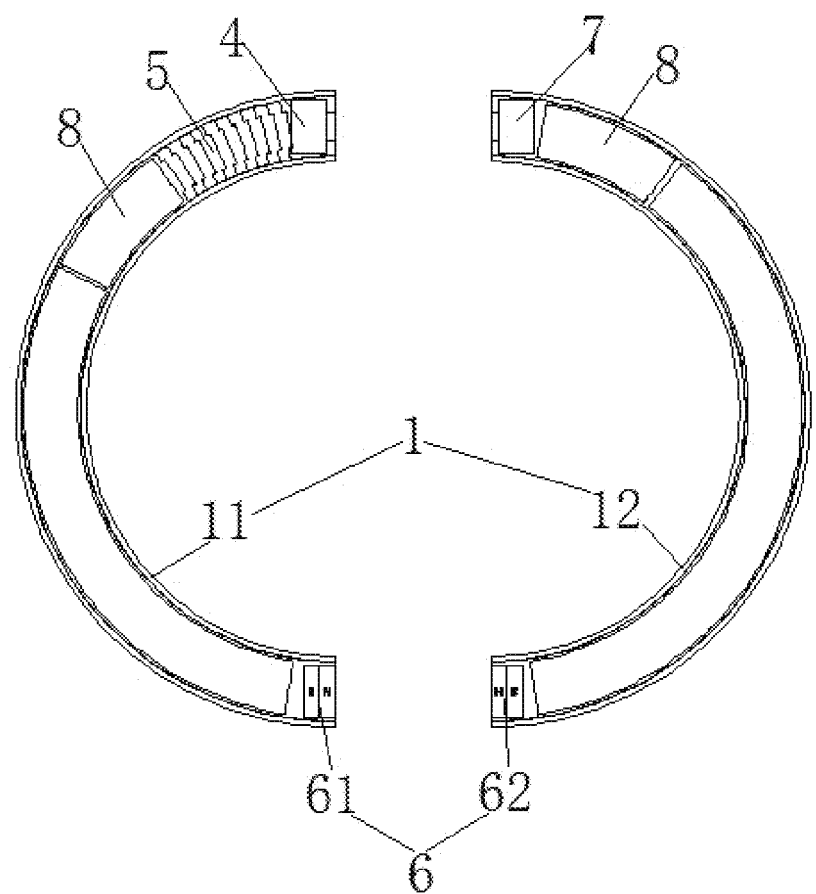
FIG. 8 is a schematic diagram of a using state of a wearable member including only a camera module according to an embodiment of this application.

In some implementations, as shown in FIG. 2 and FIG. 8, the wearable member is a bracelet, and the first body 11 is detachably connected to the second body 12 by using a connection assembly 6. In other words, the first body 11 and the second body 12 may be two semi-rings, and lengths of the two semi-rings may be the same or different. The first body 11 and the second body 12 are connected to each other by using the connection assembly 6, that is, an end of one of the two semi-rings are respectively connected to a corresponding end of the other semi-ring, to form an entire bracelet, so that a user can wear and use the bracelet conveniently. The connection assembly 6 may be connected, at the same time, to two joints that are respectively located at two ends of the two semi-rings. Structures of the connection assembly 6 at the two joints may be different. In some implementations, the connection assembly 6 may be connected to only one joint at an end of one of the semi-rings, while the other joint is in a butted or detached state. The connection assembly 6 includes a mechanical connection structure such as a buckle, or may be a connection structure of another type. This increases a use manner of the wearable member, improves a sense of science and technology, and enhances user experience. The first body 11 and the second body 12 may each have a wireless transmission module. For example, the camera module 4 is disposed on the first body 11, and the light source 3 is disposed on the second body 12. Signal transmission for an image shot by the camera module 4 can be formed by using the wireless transmission modules and the light source 3. Then, the image obtained by the camera module 4 is displayed in the overlapped region by using the light source 3.

In this implementation, the gas emitter 2 is disposed in the first body 11, the light source 3 is disposed in the second body 12, and a region between the first body 11 and the second body 12 is a target region. When the first body 11 and the second body 12 are in a disconnected state, and there is a specific distance between the first body 11 and the second body 12, the overlapped region between the gas emitted by the gas emitter 2 and the light beam 10 emitted by the light source 3 can be enlarged, thereby enlarging an imaging space. In some implementations, when the first body 11 and the second body 12 are connected to each other, the image may be displayed in the region between the first body 11 and the second body 12, thereby reducing a space occupied by the wearable member during imaging. This endows the bracelet with a plurality of use manners, increases a fresh feeling of users, and promotes consuming desires of consumers.

Further, as shown in FIG. 8, the bracelet may not be provided with the gas emitter 2 and the light source 3, but the bracelet is provided with only the flexible section 5 and the camera module 4. The camera module 4 is disposed on an end surface at an end of the first body 11 of the bracelet. Because the image shooting direction of the camera module 4 is changed by using the flexible section 5, the bracelet has a unique layout. This brings a fresh feeling to consumers, helps the consumers determine the image shooting direction, and helps the consumers shoot images.

Figure 7:
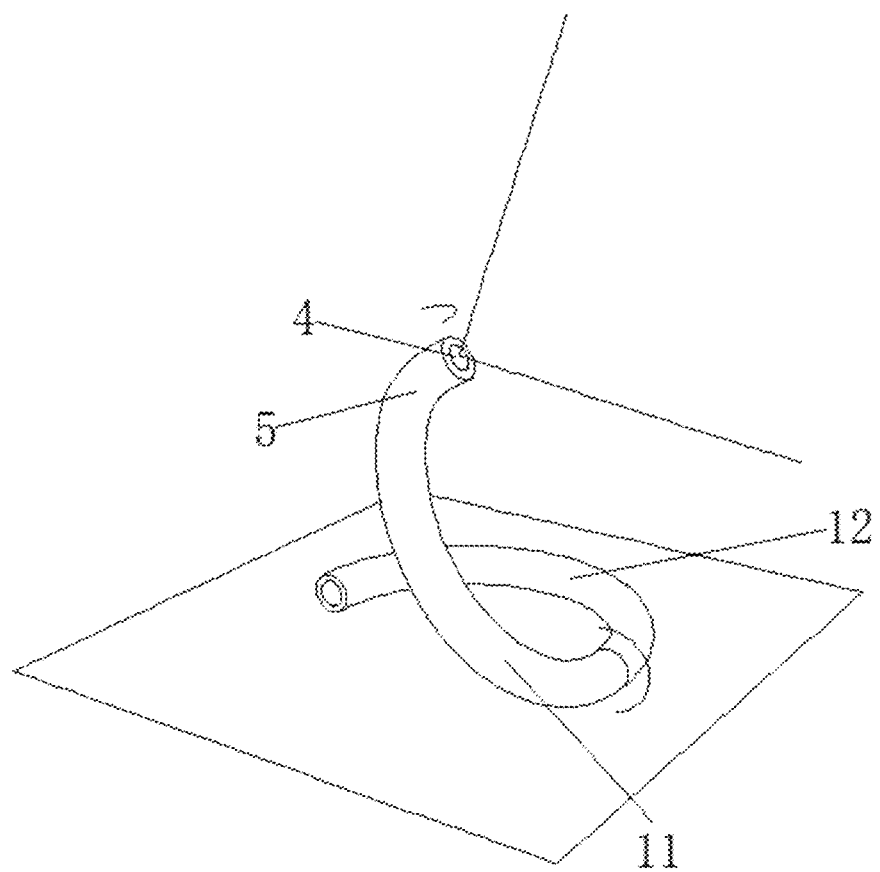
FIG. 7 is a schematic diagram of a fourth using state of a wearable member according to an embodiment of this application.

In some implementations, the first body 11 is provided with a first end and a second end opposite to the first end, and the second body 12 is provided with a third end and a fourth end opposite to the third end. The first end is detachably connected to the third end by using the connection assembly 6. In a state that the first end and the third end are connected to each other and the second end and the fourth end are separate from each other, the first body 11 and the second body 12 can rotate relative to each other. As shown in FIG. 7, when the camera module 4 is located at the second end of the first body 11, the first body 11 of the bracelet is rotated relative to the second body 12, the second body 12 of the bracelet is placed on a table to be used as a base, and the camera module 4 is supported in the air by the first body 11. In addition, the image shooting direction of the camera module 4 can be changed by using the flexible section 5, so that the entire bracelet forms an image shooting apparatus having a bracket. Due to this disposing manner of the camera module 4, a sense of science and technology of the product is enhanced, and user experience is improved. The connection assembly 6 connected to the first end and the third end may include a clamping part disposed at the first end and a clamped part disposed at the third end. The clamping part has a clamping space whose size can be adjusted. When it is necessary to connect the first end to the third end, the clamped part can be placed in the clamping space. Then, the clamping space is decreased, so that the clamped part is clamped in the clamping space, thereby connecting the first end to the third end. The clamped part is a revolution structure, so that the clamped part can rotate in the clamping space, and a specific friction force is generated between the clamped part and a side wall of the clamping space. Therefore, the first body 11 and the second body 12 can maintain relative positions when rotating relative to each other, so that the camera module 4 can be placed in the air. The connection assembly 6 may include a rubber sleeve disposed at the first end and a spherical end disposed at the third end. When it is necessary to connect the first end to the third end, the spherical end can be inserted into the rubber sleeve, so that the rubber sleeve sleeves the spherical end to ensure a connection between the first end and the third end, and it can be ensured that the spherical end rotates in the rubber sleeve in a case that resistance exists.

Figure 4:
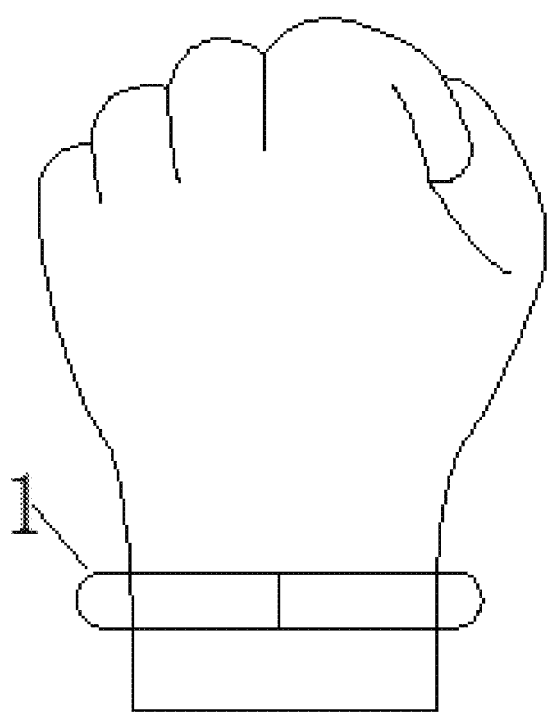
FIG. 4 is a schematic diagram of a wearing state of a wearable member according to an embodiment of this application.
Figure 5:
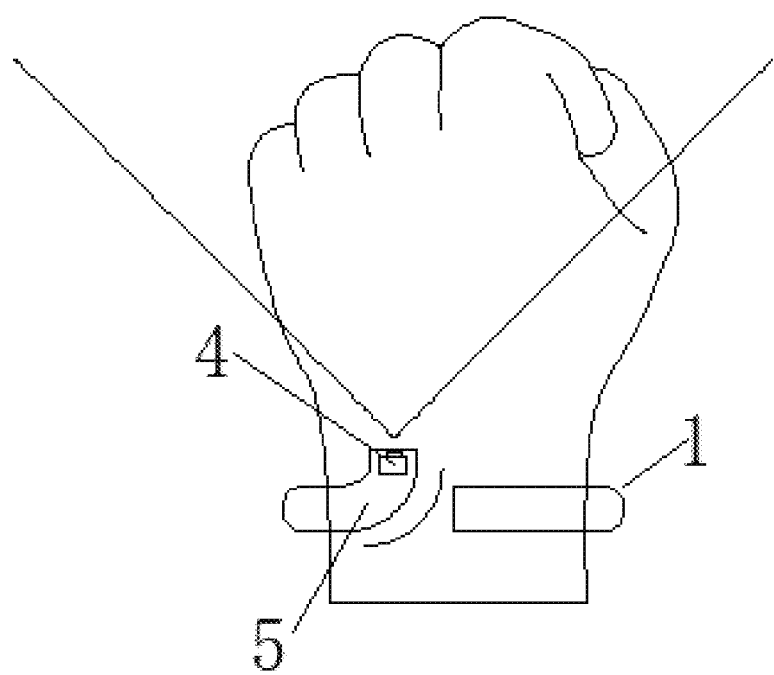
FIG. 5 is a schematic diagram of a second using state of a wearable member according to an embodiment of this application.
Figure 6:
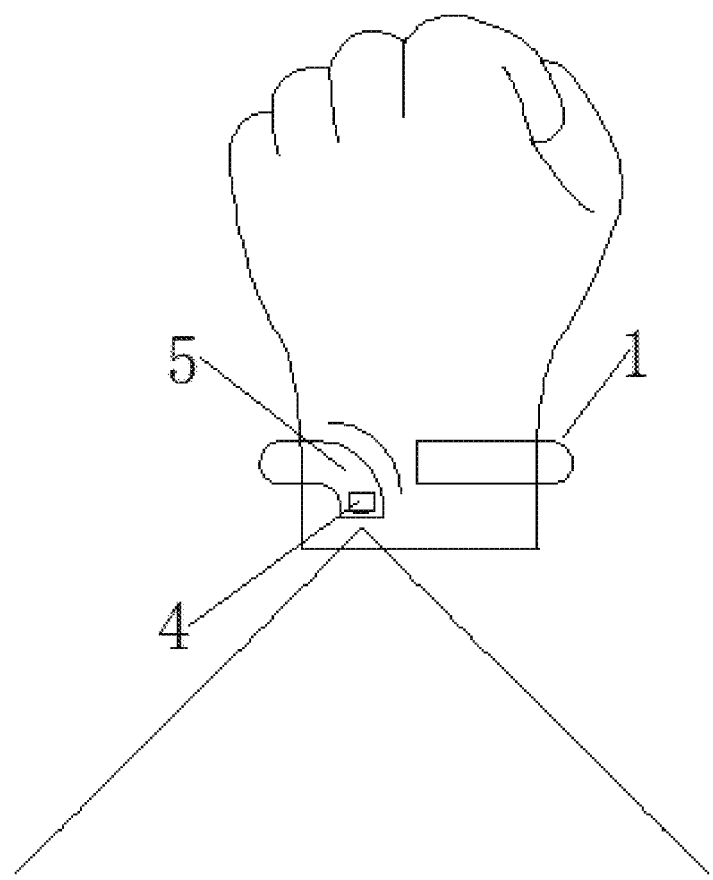
FIG. 6 is a schematic diagram of a third using state of a wearable member according to an embodiment of this application.

Further, when the camera module 4 is mounted at the second end of the first body 11, there may be another use manner. For example, as shown in FIG. 4 to FIG. 6, when the bracelet is worn on a wrist, a user of the bracelet can align an image shooting angle of the camera module 4 with the face of the user by changing an angle of the flexible section 5, thereby taking a selfie. When the bracelet is worn on the wrist, the user of the bracelet can align the image shooting angle of the camera module 4 with scenery in front of the user by changing the angle of the flexible section 5, thereby taking a picture of the scenery. In some implementations, the bracelet may be hung or wound at a specific position for image shooting or the like, so that the user can operate the bracelet to take pictures in different manners. This improves user experience.

In some implementations, the wearable member includes a trigger 7. The camera module 4 is disposed at the second end. The trigger 7 is disposed at the fourth end. For a manner of disposing the trigger 7 at the fourth end, reference may be made to the manner of disposing the camera module 4 at the end of the main body 1. The trigger 7 is configured to: enable the camera module 4 to obtain an image, or control on/off of a power supply. In some implementations, a same trigger 7 can not only control the camera module 4 to obtain an image, but also control the on/off of the power supply. For example, an image captured by the camera module 4 can be obtained by triggering the trigger 7 once; and the on/off of the power supply or the like can be controlled by touching and holding the trigger 7 for 3 seconds. The trigger 7 may be of a structure in a form of a touch type, a button type, or the like. In some implementations, the structure is of the button type. The bracelet can be provided with a physical button. In a case that the bracelet is crashed or in other cases, the bracelet can be forcibly controlled, thereby avoiding a phenomenon that the bracelet cannot be operated.

Further, a groove is formed in an end surface of the fourth end of the second body 12 of the bracelet. The trigger 7 is disposed in the groove, so that the trigger 7 can be protected. The second end that is of the first body 11 and on which the camera module 4 is mounted is butted with the fourth end that is of the second body 12 and on which the trigger 7 is mounted. Therefore, when the bracelet is in a normally worn state, it can be ensured that both the camera module 4 and the trigger 7 can be hidden by each other, thereby implementing all-round protection of the two. For example, for the camera module 4, a lens of the camera module 4 can be protected from being scratched. For the trigger 7, this can prevent the trigger 7 from being triggered by mistake, and ensure overall aesthetics of the bracelet.

In some implementations, the connection assembly 6 includes a first magnet 61 and a second magnet 62. The first magnet 61 is disposed at the first end. The second magnet 62 is disposed at the third end. In other words, the first body 11 and the second body 12 of the bracelet are connected to each other by the magnets, so that the user can put on and take off the bracelet conveniently, and it can be ensured that the first body 11 and the second body 12 can rotate relatively. This provides a convenient condition for implementing a plurality of use manners of the bracelet. The first magnet 61 and the second magnet 62 can directly attract each other, or the first magnet 61 and the second magnet 62 may be designed into specific structures. In some implementations, the first magnet 61 and the second magnet 62 can cooperate with other specific structures when attracting each other, so that the first magnet 61 and the second magnet 62 connect the first end to the third end; and the first body 11 and the second body 12 can rotate relative to each other when the first end is connected to the third end.

Further, the wearable member further includes a battery. The battery is disposed in the wearable member, to provide electrical energy for the wearable member, where the battery is a flexible battery that can be bent freely. In addition, the main body 1 of the wearable member also has a specific degree of flexibility, thereby avoiding a phenomenon that the user feels dis-comfortable because the wearable member is too rigid.

In the description of this specification, the description with reference to terms such as "an embodiment," "some embodiments," "a schematic embodiment," "an example," "a specific example," or "some examples" means that specific features, structures, materials, or characteristics described in combination with the embodiments or examples are included in at least one embodiment or example of this application. In this specification, the schematic descriptions of the above terms do not necessarily refer to the same embodiment or example. Moreover, the specific features, structures, materials, or characteristics described may be combined in a proper way in any one or more embodiments or examples.

Although the embodiments of this application have been shown and described, those of ordinary skill in the art can understand that various changes, modifications, replacements, and variants may be made to these embodiments without departing from the principle and purpose of this application, and the scope of this application is limited by the claims and their equivalents.

What is claimed is:

1. A wearable member, comprising:
a main body, wherein the main body comprises a first body and a second body, the first body and the second body jointly define a target region, the main body is provided with an accommodating space, a side wall, close to the target region, of the main body is provided with a first hole and a second hole, and the first hole and the second hole are communicated with the accommodating space;
a gas emitter, wherein the gas emitter is disposed in the accommodating space, and an air outlet of the gas emitter is opposite to the first hole; and
a light source, wherein the light source is disposed in the accommodating space, and an out-light surface of the light source is opposite to the second hole, wherein the gas emitter emits gas to the target region through the first hole, the light source emits a light beam to the target region through the second hole, and an overlapped region between a region comprising the gas and a region comprising the light beam is used to display an image,
wherein the wearable member is a bracelet, and the first body is detachably connected to the second body by using a connection assembly.

2. The wearable member according to claim 1, further comprising: a camera module, wherein the camera module is disposed on the main body, the camera module is electrically connected to the light source, and the overlapped region is used to display an image obtained by the camera module.

3. The wearable member according to claim 2, wherein the main body is provided with a flexible section, and an orientation of the camera module changes when a bending angle of the flexible section changes.

4. The wearable member according to claim 3, wherein the camera module is disposed at an end, close to the flexible section, of the main body.

5. The wearable member according to claim 2, wherein the camera module is disposed at an end of the main body.

6. The wearable member according to claim 1, wherein the first body is provided with a first end and a second end opposite to the first end, and the second body is provided with a third end and a fourth end opposite to the third end, and
wherein the first end is detachably connected to the third end by using the connection assembly, and in a state that the first end and the third end are connected to each other and the second end and the fourth end are separate from each other, the first body and the second body can rotate relative to each other.

7. The wearable member according to claim 6, further comprising: a trigger, wherein the camera module is disposed at the second end, the trigger is disposed at the fourth end, and the trigger is configured to control on and off of a power supply or enable the camera module to obtain an image.

8. The wearable member according to claim 7, wherein the connection assembly comprises a first magnet and a second magnet, wherein the first magnet is disposed at the first end, and the second magnet is disposed at the third end.

9. The wearable member according to claim 1, wherein the gas emitter is disposed opposite to the light source.

10. The wearable member according to claim 1, wherein the gas emitter is disposed in the first body, and the light source is disposed in the second body.

11. A wearable member, comprising:
a main body, wherein the main body comprises a first body and a second body, the first body and the second body jointly define a target region, the main body is provided with an accommodating space, a side wall, close to the target region, of the main body is provided with a first hole and a second hole, and the first hole and the second hole are communicated with the accommodating space;
a gas emitter, wherein the gas emitter is disposed in the accommodating space, and an air outlet of the gas emitter is opposite to the first hole; and
a light source, wherein the light source is disposed in the accommodating space, and an out-light surface of the light source is opposite to the second hole, wherein the gas emitter emits gas to the target region through the first hole, the light source emits a light beam to the target region through the second hole, and an overlapped region between a region comprising the gas and a region comprising the light beam is used to display an image,
wherein the wearable member further comprises a camera module electrically connected to the light source, and the overlapped region is used to display an image obtained by the camera module,
wherein the main body is provided with a flexible section, and an orientation of the camera module changes when a bending angle of the flexible section changes.

12. The wearable member according to claim 11, further comprising: a camera module, wherein the camera module is disposed on the main body, the camera module is electrically connected to the light source, and the overlapped region is used to display an image obtained by the camera module.

13. The wearable member according to claim 12, wherein the camera module is disposed at an end, close to the flexible section, of the main body.

14. The wearable member according to claim 11, wherein the gas emitter is disposed opposite to the light source.

15. The wearable member according to claim 11, wherein the gas emitter is disposed in the first body, and the light source is disposed in the second body.

16. A wearable member, comprising:
a main body, wherein the main body comprises a first body and a second body, the first body and the second body jointly define a target region, the main body is provided with an accommodating space, a side wall, close to the target region, of the main body is provided with a first hole and a second hole, and the first hole and the second hole are communicated with the accommodating space;
a gas emitter, wherein the gas emitter is disposed in the accommodating space, and an air outlet of the gas emitter is opposite to the first hole; and
a light source, wherein the light source is disposed in the accommodating space, and an out-light surface of the light source is opposite to the second hole, wherein the gas emitter emits gas to the target region through the first hole, the light source emits a light beam to the target region through the second hole, and an overlapped region between a region comprising the gas and a region comprising the light beam is used to display an image, wherein the gas emitter is disposed in the first body, and the light source is disposed in the second body.

17. The wearable member according to claim 16, further comprising: a camera module, wherein the camera module is disposed on the main body, the camera module is electrically connected to the light source, and the overlapped region is used to display an image obtained by the camera module.

18. The wearable member according to claim 17, wherein the camera module is disposed at an end, close to the flexible section, of the main body.

19. The wearable member according to claim 16, wherein the first body is provided with a first end and a second end opposite to the first end, and the second body is provided with a third end and a fourth end opposite to the third end, and wherein the first end is detachably connected to the third end by using a connection assembly, and in a state that the first end and the third end are connected to each other and the second end and the fourth end are separate from each other, the first body and the second body can rotate relative to each other.

20. The wearable member according to claim 16, wherein the gas emitter is disposed opposite to the light source.

\* \* \* \* \*